US010412068B2

(12) United States Patent
Peddada

(10) Patent No.: US 10,412,068 B2
(45) Date of Patent: Sep. 10, 2019

(54) API AUTHENTICATION

(71) Applicant: salesforce.com, inc., San Francisco, CA (US)

(72) Inventor: Prasad Peddada, Alameda, CA (US)

(73) Assignee: salesforce.com, inc., San Francisco, CA (US)

( * ) Notice: Subject to any disclaimer, the term of this patent is extended or adjusted under 35 U.S.C. 154(b) by 321 days.

(21) Appl. No.: 14/961,784

(22) Filed: Dec. 7, 2015

(65) Prior Publication Data

US 2017/0163618 A1  Jun. 8, 2017

(51) Int. Cl.
  *H04L 9/32* (2006.01)
  *H04L 29/06* (2006.01)
  *H04L 9/08* (2006.01)

(52) U.S. Cl.
  CPC ............ *H04L 63/08* (2013.01); *H04L 9/0844* (2013.01); *H04L 9/0869* (2013.01); *H04L 9/3236* (2013.01); *H04L 63/0442* (2013.01); *H04L 63/10* (2013.01)

(58) Field of Classification Search
  CPC ..... H04L 63/08; H04L 9/3236; H04L 9/0869; H04L 9/0844; H04L 63/10; H04L 63/0442
  See application file for complete search history.

(56) References Cited

U.S. PATENT DOCUMENTS

| | | | |
|---|---|---|---|
| 4,200,770 A | 4/1980 | Hellman et al. | |
| 9,098,315 B1* | 8/2015 | Kapoor | G06F 9/541 |
| 2006/0177056 A1* | 8/2006 | Rostin | H04L 9/0869 380/46 |
| 2009/0006860 A1* | 1/2009 | Ross | H04L 63/126 713/189 |
| 2010/0125612 A1* | 5/2010 | Amradkar | H04L 63/0807 707/802 |
| 2011/0302646 A1* | 12/2011 | Ronda | H04L 9/3213 726/9 |
| 2012/0179913 A1* | 7/2012 | Kirk | H04L 9/3247 713/176 |
| 2014/0229729 A1* | 8/2014 | Roth | H04L 63/0471 713/153 |
| 2014/0250456 A1* | 9/2014 | Ramkumar | H04N 21/814 725/33 |

* cited by examiner

*Primary Examiner* — Fatoumata Traore
*Assistant Examiner* — Carlton Johnson
(74) *Attorney, Agent, or Firm* — Meyertons, Hood, Kivlin, Kowert & Goetzel, P.C.

(57) ABSTRACT

Techniques are disclosed relating to signing and authentication of network messages such as API calls. A server system and a client system may collaboratively establish a shared secret key, which is then usable to sign such messages. These techniques may be useful in various situations, such as for integrations between different systems.

20 Claims, 6 Drawing Sheets

API AUTHENTICATION

BACKGROUND

Technical Field

This disclosure relates to authenticated electronic communications, and more particularly to authentication of networked application programming interface (API) communications.

Description of the Related Art

Providers of resources (e.g., web applications, websites, data, files, database access, cloud computing, etc.) over a network (e.g., the Internet) typically keep track of user session ID information via session cookies or the like. For example, a website may send a cookie to a user's browser. Afterward, every time the user requests a new link from the website, the user's browser may send that cookie back to the website to authenticate that the same user is still browsing. In another example, token-based authentication (e.g., using a username and password) may be used for authenticated API access.

Unfortunately, some implementations of session cookie and token-based systems may be susceptible to so-called "session hijacking," which is a type of man-in-the-middle (MITM) attack. Various types of session hijacking schemes are known in the art, and they pose a problem for organizations that rely on being able to reliably authenticate users.

Such attacks may occur, for example, in multi-tenant database systems, and system-wide solutions available to multiple tenants may be desired. Multi-tenant database systems allow users to access applications and/or data from a network source that, to the user, appears to be centralized, but might actually be distributed for backup, redundancy, and/or performance reasons. An example of a multi-tenant system is a computing system that is accessible to multiple independent parties to provide those parties with application execution and/or data storage. Where there is an appearance of centralization, each subscribing party (e.g., a "tenant") can access the system to perform application functions, including manipulating that tenant's data. Each tenant may provide content to multiple users (e.g., customers or employees) within that tenant, and safeguarding user data is typically important in such systems.

With a multi-tenant system, the tenants have the advantage that they need not install software, maintain backups, move data to laptops to provide portability, etc. Rather, each tenant user need only be able to access the multi-tenant system to operate the applications and access that tenant's data. One such system usable for customer relationship management is the multi-tenant system accessible to salesforce.com subscribers. With such systems, a user need only have access to a user system with network connectivity, such as a desktop computer with Internet access and a browser or other HTTP client, or other suitable Internet client.

Techniques to securely authenticate user access to network resources are desired, in multi-tenant systems as well as various other types of systems.

DETAILED DESCRIPTION

Figure 1:
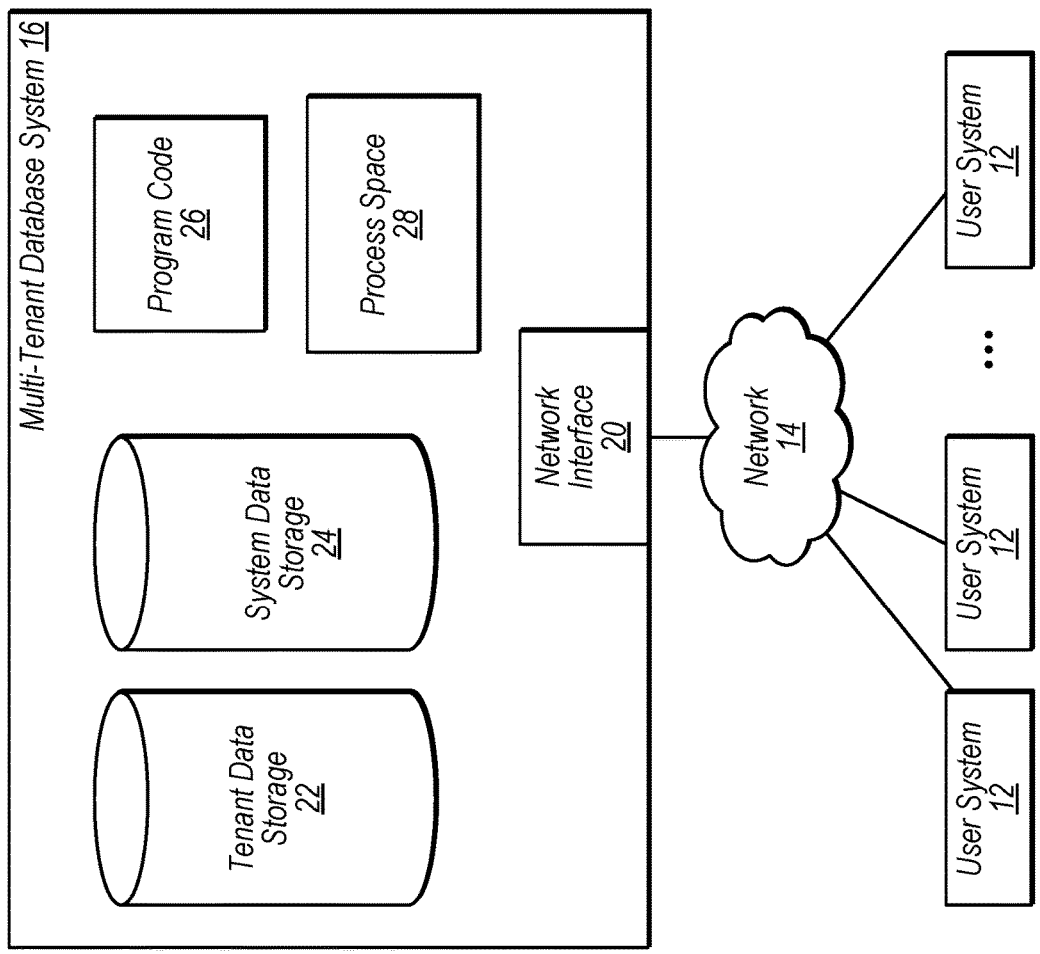
FIG. 1 is a block diagram illustrating an example environment for a multi-tenant database system, according to some embodiments.
Figure 2:
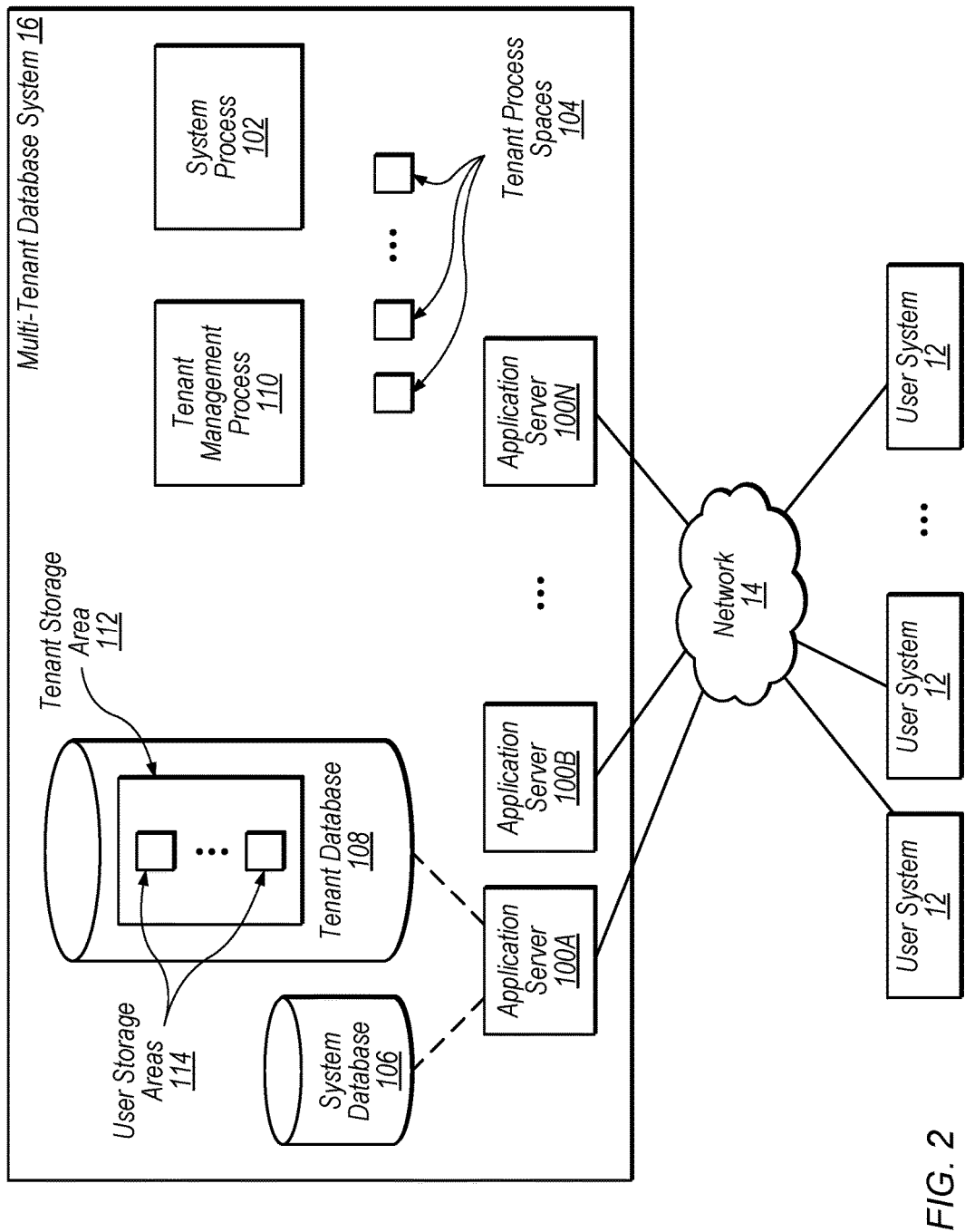
FIG. 2 is a block diagram illustrating an example multi-tenant database system in more detail, according to some embodiments.

This disclosure initially describes, with reference to FIGS. 1-2, embodiments of an example multi-tenant database system. It then describes, with reference to FIGS. 3-6, embodiments relating to signing and authentication of API calls over a network. Finally, an example computing system is shown at FIG. 7.

Example Multi-Tenant Database Systems

FIG. 1 illustrates an example environment in which a multi-tenant database system might be implemented. Various embodiments of this disclosure will be described with reference to such a multi-tenant database system, but one of ordinary skill in the art with the benefit of this disclosure will understand various other types of systems to which this disclosure applies. As illustrated in FIG. 1 (and in more detail in FIG. 2) one or more user systems 12 may interact via a network 14 with a multi-tenant database system (MTS) 16. The users of those user systems 12 may be users in differing capacities, and the capacity of a particular user system 12 might be determined by the identity of the current user. For example, when a salesperson is using a particular user system 12 to interact with MTS 16, that user system 12 may have the capacities allotted to that salesperson. However, while an administrator is using the same user system 12 to interact with MTS 16, it has the capacities allotted to that administrator.

Network 14 may be a LAN (local area network), WAN (wide area network), wireless network, point-to-point network, star network, token ring network, hub network, or any other appropriate configuration. The Internet will be used in many of the examples herein and is one example of a TCP/IP (Transfer Control Protocol and Internet Protocol) network. It should be understood, however, that this disclosure may use any of various other types of networks.

User systems 12 may communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a browser for sending and receiving HTTP messages from an HTTP server at MTS 16. Such an HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Each of the plurality of servers may have access to the MTS's data, at least for the users that are accessing a server.

In some embodiments, the system shown in FIG. 1 implements a web-based customer relationship management (CRM) system. For example, in some embodiments, MTS 16 includes application servers configured to implement and execute CRM software applications as well as provide related data, code, forms, web pages and other information to and from user systems 12 and to store to, and retrieve from, a database system related data, objects and web page content. In embodiments of a multi-tenant system, tenant data may be arranged so that data of one tenant is kept separate from that of other tenants so that that one tenant does not have access to another tenant's data, unless such data is expressly shared.

One arrangement for elements of MTS 16 is shown in FIG. 1, including a network interface 20, storage 22 for tenant data, storage 24 for system data accessible to MTS 16 and possibly one or more tenants, program code 26 for implementing various functions of MTS 16, and a process space 28 for executing MTS system processes and tenant-specific processes, such as running applications as part of an application service.

Several elements in the system shown in FIG. 1 may include conventional, well-known elements that need not be explained in detail here. For example, each user system 12 may be a desktop personal computer, workstation, laptop, PDA, cell phone, or any WAP-enabled device or any other computing device capable of interfacing directly or indirectly to the Internet or other network connection. User system 12 may execute an HTTP client, e.g., a browsing program, such as Microsoft's Internet Explorer™ browser or another browser, or a WAP-enabled browser in the case of a cell phone, PDA or other wireless device, or the like, allowing a user (e.g., subscriber of a CRM system) of user system 12 to access, process, and view information and pages available to it from MTS 16 over network 14. In some instances, a user (e.g., a cell phone user) may execute a dedicated application that is configured to access MTS 16 instead of a general-purpose browser. Each user system 12 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 16 or other systems or servers. As discussed above, this disclosure is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 12 and its components are operator-configurable using applications, such as a browser, that include computer code executable on one or more processing elements. Similarly, in some embodiments, MTS 16 (and additional instances of MTSs, where more than one is present) and their components are operator configurable using application(s) that include computer code executable on one or more processing elements. Thus, various operations described herein may be performed by executing program instructions stored on an article of manufacture including a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present disclosure can be implemented in any programming language that can be executed on a server or server system such as, for example, in C, C++, HTML, Java, JavaScript, or any other language.

According to one embodiment, MTS 16 is configured to provide web pages, forms, applications, data, and/or media content to user systems 12 to support the access by user systems 12 as tenants of MTS 16. As such, in this embodiment, MTS 16 provides security mechanisms to keep each tenant's data separate unless the data is intentionally shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

FIG. 2 illustrates another example embodiment of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might be allocated for each user.

It should also be understood that each application server 100 may be communicatively coupled to database systems, e.g., system database 106 and tenant database(s) 108, via a different network connection. For example, one server 100X might be coupled via the Internet, another server 100Y might be coupled via a direct network link, and another server 100Z might be coupled by yet a different network connection. TCP/IP is one protocol for communicating between application servers 100 and the database system; however, it will be apparent to one skilled in the art that other transport protocols may be used to optimize the system depending on the network interconnect used.

In some aspects, each application server 100 is configured to handle requests for any user/organization. Because it is desirable to be able to add and remove application servers from the server pool at any time for any reason, there may be in some cases be no server affinity for a user and/or organization to a specific application server 100. In one embodiment, therefore, an interface system (not shown) implementing a load balancing function (e.g., an F5 Big-IP load balancer) is communicatively coupled between application servers 100 and user systems 12 to distribute requests to application servers 100. In one aspect, the load balancer uses a least connections algorithm to route user requests to application servers 100. Other examples of load balancing algorithms, such as round robin and observed response time, also can be used. For example, in certain aspects, three consecutive requests from the same user could be routed to three different servers, and three requests from different users could be routed to the same server. In this manner, MTS 16 is multi-tenant, wherein MTS 16 handles storage of different objects and data across disparate users and organizations.

As an example of storage, one tenant might be a company that employs a sales force where each salesperson uses MTS 16 to manage their sales process. Thus, a user might maintain contact data, leads data customer follow-up data, performance data, goals and progress data, all applicable to that user's personal sales process (e.g., in tenant database 108). In some MTS embodiments, since all of this data and the applications to access, view, modify, report, transmit, calculate, eta, can be maintained and accessed by a user system having nothing more than network access, the user can manage his or her sales efforts and cycles from any of many different user systems.

While each user's sales data may be separate from other users' sales data regardless of the employers of each user, some data may be organization-wide data shared or accessible by a plurality or all of the staff for a given organization that is a tenant. Thus, there may be some data structures managed by MTS 16 that are managed at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time, and backup are desirable functions that may be implemented in the MTS.

In addition to user-specific data and tenant-specific data, MTS 16 might also maintain system level data usable by multiple tenants. Such system level data might include industry reports, news, postings, and the like that are sharable among tenants.

In certain aspects, user systems 12 communicate with application servers 100 to request and update system-level and tenant-level data from MTS 16 that may require one or more queries to system database 106 and/or tenant database 108. In some embodiments, MTS 16 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Example Methods

As noted above, current authentication systems for multi-tenant databases and other network services typically rely on session-based authentication. For example, a client system may initially authenticate via a username and password, and then store a session cookie that is provided in each subsequent message. These known authentication systems may suffer from various drawbacks, however. For example, it may in some cases be possible to conduct a MITM attack to hijack a session, allowing an unauthorized user to gain access. Further, in situations in which an organization uses a single username/password combination, it may be possible for former employees to retain unauthorized access unless strict policies are enforced to ensure that the password is changed upon employee departure.

Some embodiments of this disclosure achieve authentication by generating a secret key that is shared between a server system and a client system. This secret key may then be used to authenticate messages such as API calls that pass between the systems, obviating the need for session cookies and/or token-based authentication.

Figure 3:
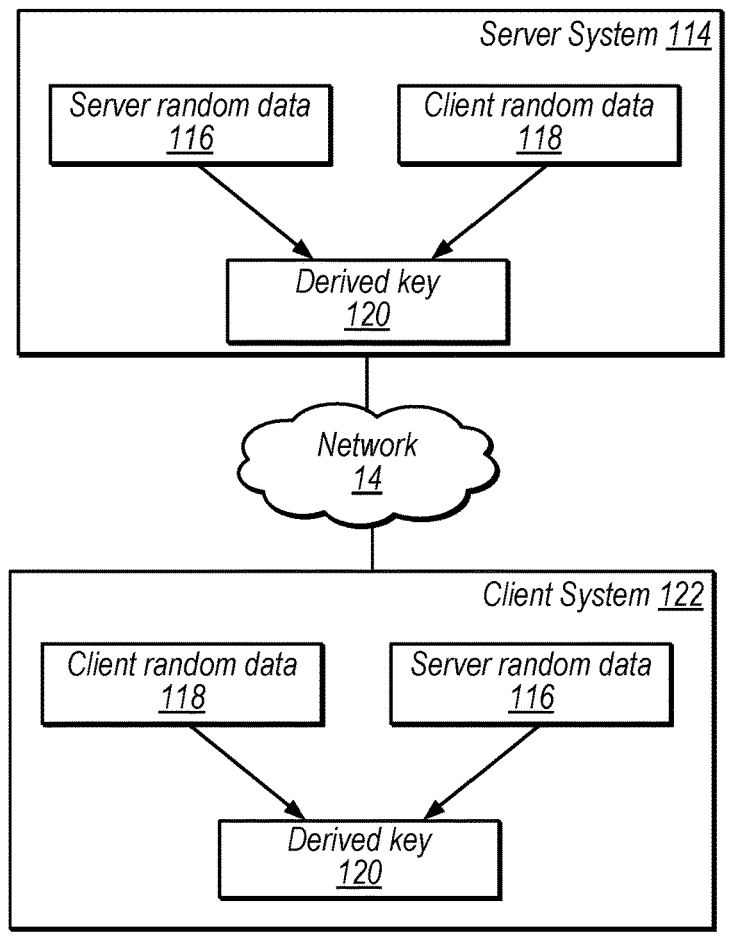
FIG. 3 is a block diagram illustrating an example of a client-server arrangement, according to some embodiments.

Turning now to FIG. 3, an embodiment is shown in which server system 114 and client system 122 are connected via network 14. In order to sign and authenticate API calls, server system 114 and client system 122 may use derived key 120, which is known by both systems. Derived key 120 may be generated in various ways that incorporate both server random data 116 and client random data 118. That is, both server system 114 and client system 122 may contribute to the randomness and cryptographic strength of derived key 120. Examples of methods of securely exchanging server random data 116 and client random data 118 are described in more detail below.

Various methods according to this disclosure will now be described. The methods herein may be used in conjunction with any of the computer systems, devices, elements, or components disclosed herein, among other devices. In various embodiments, some of the method elements shown may be performed concurrently, in a different order than shown, or may even be omitted altogether. Additional method elements may also be performed as desired.

Figure 4:
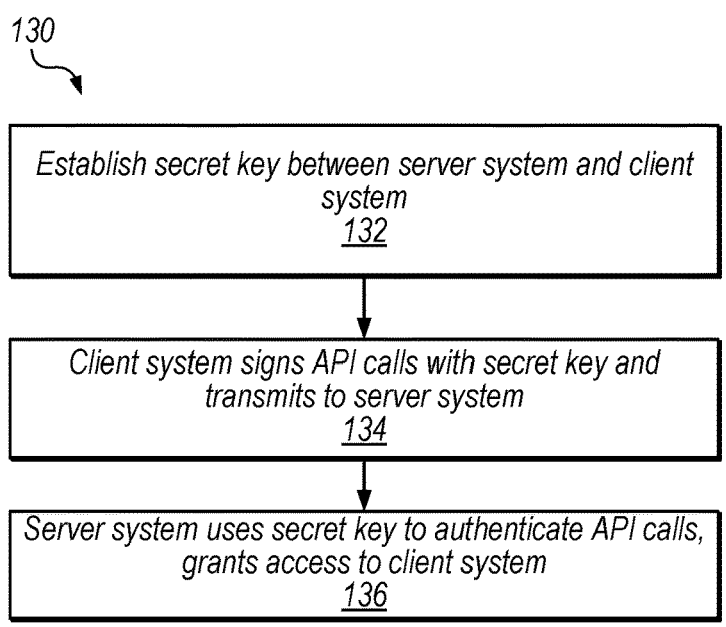
FIG. 4 is a flow diagram showing authentication of messages, according to some embodiments.

Turning now to FIG. 4, an example of a process 130 for authentication according to this disclosure is shown. FIG. 4 presents a high-level description of one embodiment of the present disclosure.

At step 132, a secret key is established between a server system and a client system. Various ways of establishing a secret key are contemplated within the scope of this disclosure. One possibility is described in more detail below with reference to FIG. 5. Other possibilities for securely establishing a secret key include transmitting a secret key from one device (the server or the client) to the other via a previously established encryption channel, sharing a secret key via some other secure method, etc. In various instances, the secret key may be established on a per-user basis, a per-computer basis, a per-tenant basis, etc. Flow proceeds to step 134.

At step 134, the client system attempts to access an API supported by the server system. In order to authenticate itself, the client cryptographically signs the API call (or the network message including the API call) with the secret key. Various types of cryptographic signing are contemplated within this disclosure. For example, HMAC algorithms may in some embodiments be used for the signatures. In some instances, the client may also include a signed timestamp with the API call for additional security (e.g., to prevent replay attacks, etc.). Flow proceeds to step 136.

At step 136, the server system receives the signed API call. Because the server system is also in possession of the secret key that the client system used to sign the API call, the server is able to compute the same cryptographic signature that the client computed. If the server determines that the signatures match, the client is authenticated and the API call is allowed to proceed.

Typically, each subsequent message from the client system to the server system is also signed with the same derived secret key. The server system may also in some instances sign its responses to the client system with the same derived secret key, to allow the client system to verify that the responses are genuine and not the product of a MITM attack or the like. Flow ends at step 136.

Figure 5:
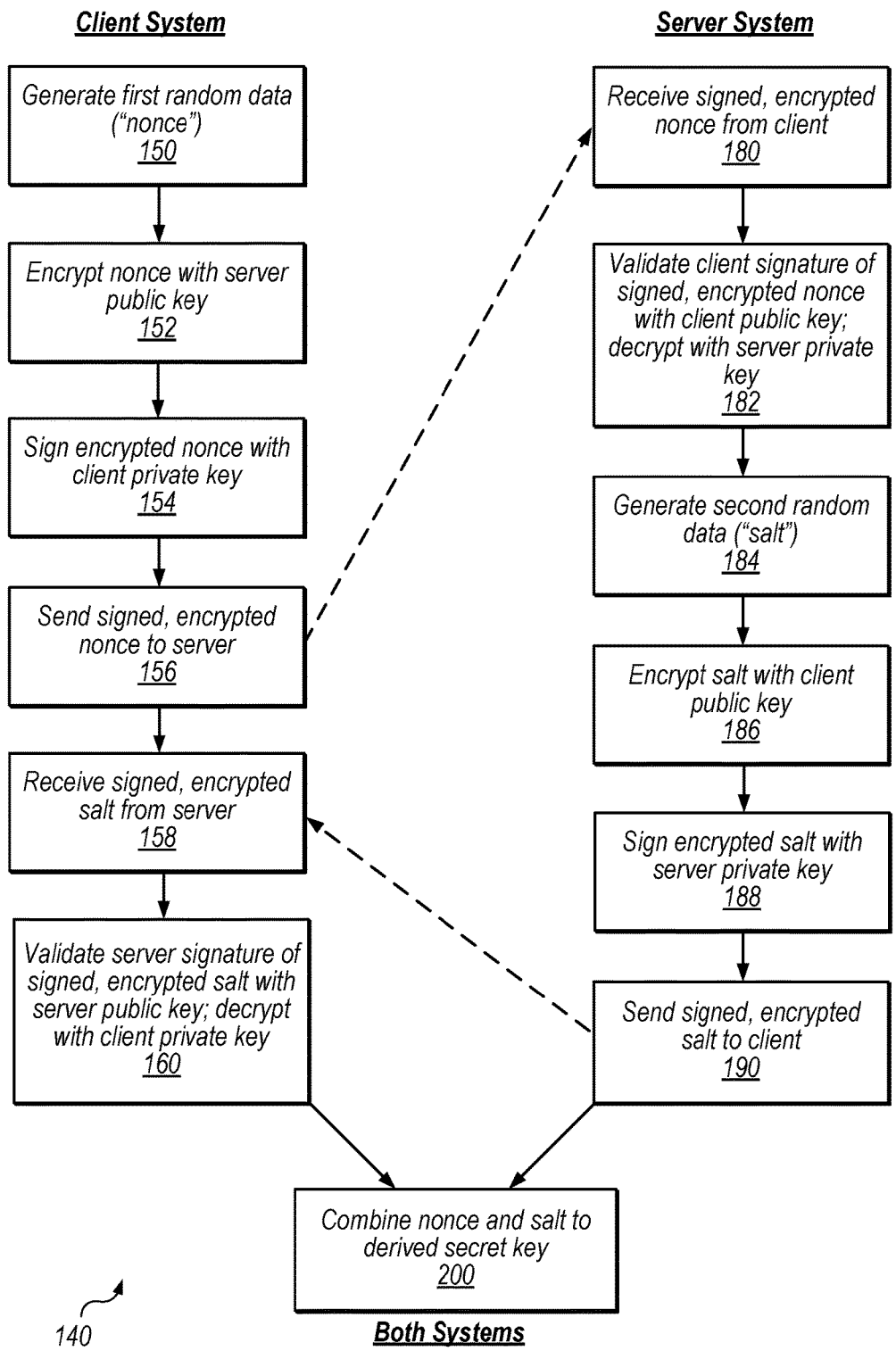
FIG. 5 is a flow diagram showing determination of a derived secret key, according to some embodiments.

Turning now to FIG. 5, an example of a method 140 to establish a secret key between a client system and a server system is presented. In this example, the actions performed by the client system are shown on the left-hand side of the figure, and the actions performed by the server system are shown on the right-hand side of the figure. Actions that may be taken by both systems are shown in the center of the figure. Flow begins at step 150.

At step 150, the client system generates a first item of random data. In some cases, this may be referred to as a "nonce" or a "cryptographic nonce." Many possibilities for the nonce will be apparent to one of ordinary skill in the art with the benefit of this disclosure. For example, the nonce may be generated randomly. In some embodiments, the nonce may incorporate some non-random data as well, such as a timestamp, a MAC address, a machine ID, etc. The client system may be able to ensure the security of later steps in the method by ensuring that the nonce has sufficiently strong cryptographic randomness properties. For purposes of this disclosure, the term "random" is defined as encompassing truly random data as well as pseudorandom data. The term is further defined as including combinations of truly random and pseudorandom data. Further, in some instances, an item of random data may be used to derive a new item of data that incorporates some or all of such randomness (e.g., via a key stretching technique). This new item of data may also be referred to as random data. Flow proceeds to step 152.

At step 152, the client system encrypts the nonce with the server's public encryption key. This ensures that when the nonce is later transmitted to the server system, it cannot be tampered with by unauthorized parties. Flow proceeds to step 154.

At step 154, the client system cryptographically signs the encrypted nonce with the client system's own private signing key. This ensures that, when the server system later receives the nonce, it can be verified to have come from the client system rather than from some other unauthorized party. Flow proceeds to step 156.

At step 156, the client system sends the signed, encrypted nonce to the server system. This may be done via any standard network transport method, such as HTTP, HTTPS, or other protocols. The server system receives the signed, encrypted nonce at step 180, and flow proceeds to step 182 at the server system.

At step 182, the server system validates the signature of the signed, encrypted nonce by using the client system's public signing key. The server system also decrypts the nonce with the server system's own private encryption key to obtain the plaintext nonce. In some embodiments, the server may store a hash of the nonce sent by the client, e.g., along with a timestamp of when it was sent. This may help prevent the client from sending the same nonce more than once. Flow proceeds to step 184.

At step 184, the server system generates a second item of random data. In some instances, this data may be referred to as the server's "salt." As with the nonce described above, many possibilities for the salt will be apparent to one of ordinary skill in the art with the benefit of this disclosure. In some cases, the nonce and the salt may be the same length; however, in some cases, they may be different lengths. The nonce and the salt may or may not have similar cryptographic properties. Flow proceeds to step 186.

At step 186, the server system encrypts the salt with the client system's public key. At step 188, the server system cryptographically signs the encrypted salt with the server system's own private key. And at step 190, the server system transmits the signed, encrypted salt to the client system. Flow proceeds to step 158 at the client system.

At step 158, the client system receives the signed, encrypted salt from the server system. At step 160, the client system validates the server system's signature of the signed, encrypted salt by using the server system's public key and decrypts the salt by using the client system's private key. At this point in the process, the client system and the server system are both in possession of the plaintext nonce and the plaintext salt. Further, because of the cryptographic signing discussed above, both systems can be assured that the nonce or salt respectively from the other system is genuine. Flow proceeds to step 200.

At step 200, the client system and the server system both combine the nonce and the salt to determine respective copies of an item of shared secret data (also referred to as a shared key, a secret key, or a derived secret key). This combining may be done in various (typically pre-agreed) ways known in the art, such as by the use of a cryptographic key derivation function. For example, a Password-Based Key Derivation Function such as PBKDF2 may be used. Various other possibilities for combining two items of random data into a cryptographically secure shared key (also referred to as a symmetric authentication key) will be understood by one of ordinary skill in the art with the benefit of this disclosure.

As described above, some aspects of FIG. 5 and other embodiments disclosed herein may rely on the existence of public and private encryption keys for server and/or client systems. Such keys may be established in various known ways. For example, server systems may typically rely on public key infrastructure (PKI) systems and certificate authorities to publish their public keys.

A client system may also use PKI systems for the maintenance of public and private keys, but in some cases clients may not use PKI. For example, the client system may include a Trusted Platform Module (TPM) chip to secure a private key, and the corresponding public key may be shared in various ways. For example, a 2048-bit RSA key for a particular user (or a particular database tenant, or a particular device) may be generated via the TPM chip, and the corresponding public key may be registered with the server system as belonging to that user/tenant/device. In some cases, a Hardware Security Module (HSM) may be used instead of a TPM chip.

Some client systems (e.g., cell phones, etc.) may not include a TPM chip or a HSM. In such instances, yet other ways of managing public and private keys are available. For example, Keychain may be used on Apple® devices, and similar functionality may also be available on Android® devices and other devices. When PKI is not available to the client, various other options may also be used to secure a private key and publish a public key.

Any of the options discussed above, as well as other known methods in the art, should be understood as falling within the scope of the discussion of public and private keys herein.

It should be noted that FIG. 5 provides one method of establishing a secret key, but various other options are also possible. For example, the server system may in some cases simply generate the secret and then share it with the client. For example, the server system may generate a secret, encrypt the secret with the client's public key, sign the encrypted secret with the server's private key, and then transmit the signed, encrypted secret to the client. The client may then validate and decrypt the secret key, and then use that secret key going forward. The embodiment of FIG. 5 may have certain advantages over such a scheme, however. For example, in FIG. 5, both the server system and the client system may contribute to the ultimate randomness and cryptographic strength of the derived secret key. In this way, either party can have some level of assurance that the derived secret key satisfies desired cryptographic properties.

Figure 6:
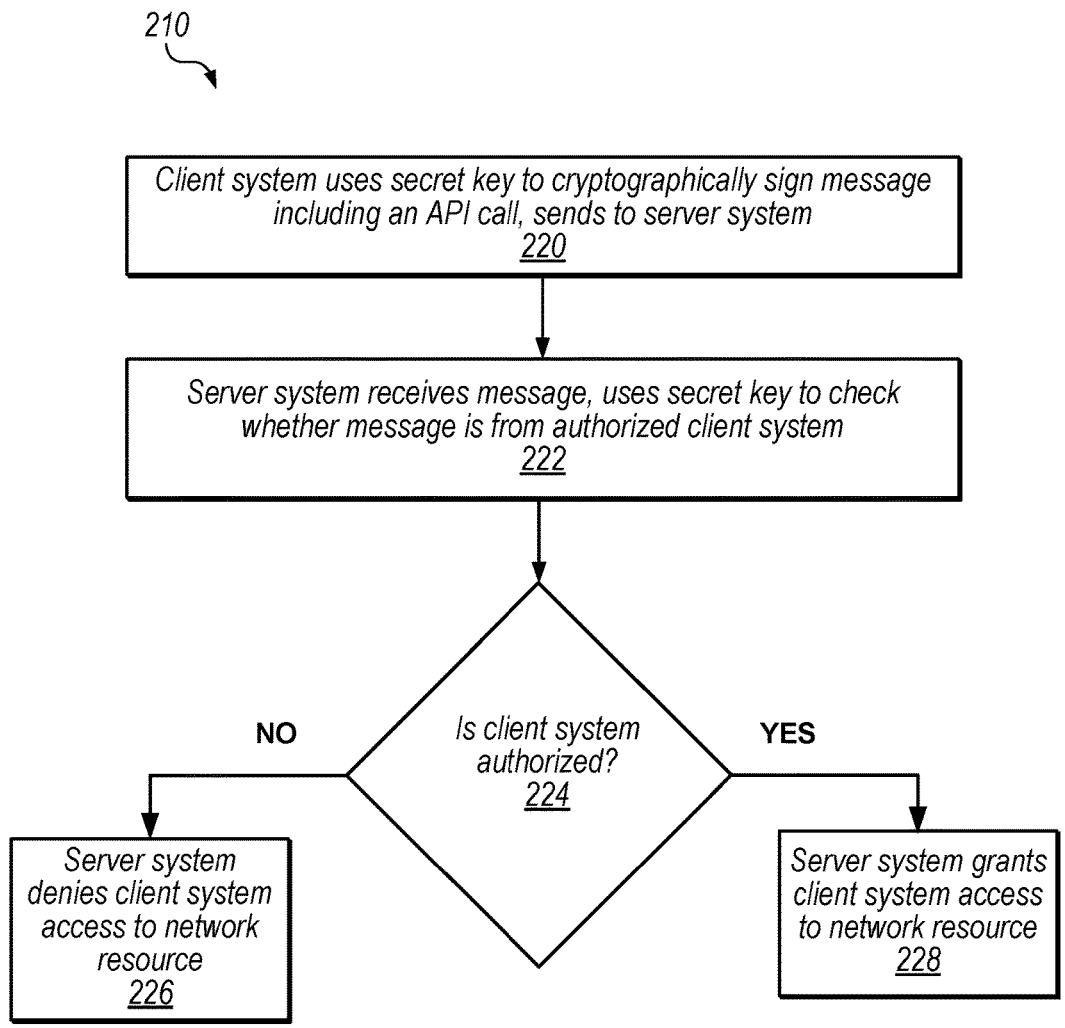
FIG. 6 is a flow diagram showing aspects of signing and authentication of messages, according to some embodiments.
Figure 7:
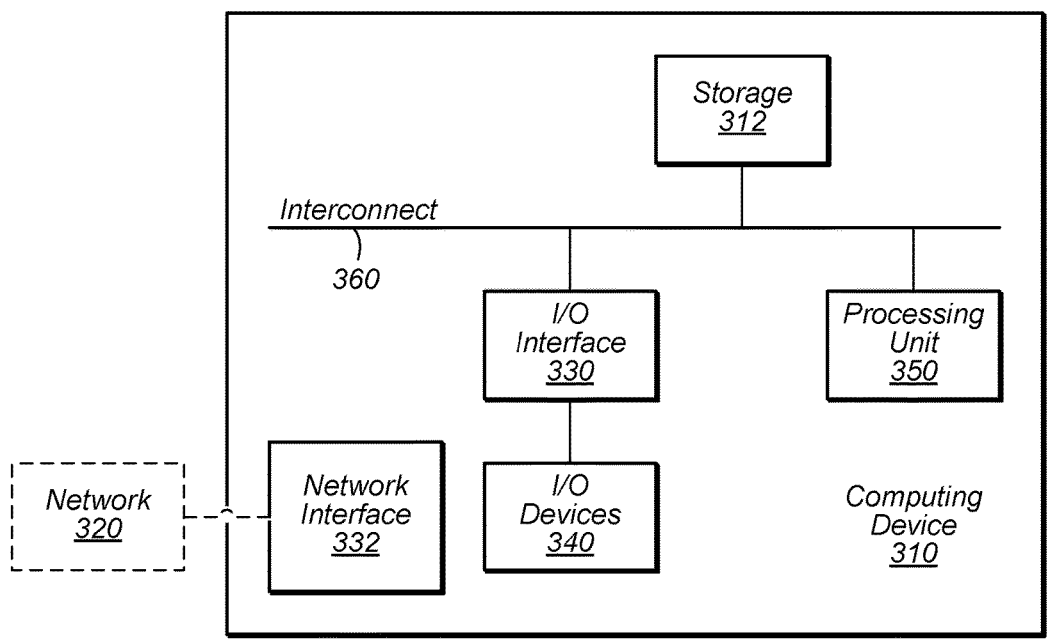
FIG. 7 is a block diagram illustrating an example computing system, according to some embodiments.

Turning now to FIG. 6, an example of a method 210 for using a secret key is shown. In method 210, the secret key is used to authenticate an API call such as for a multi-tenant database system; one of ordinary skill in the art with the benefit of this disclosure, however, will understand various other situations in which the secret key might be used.

Flow begins at step 220. At step 220, a client system uses a secret key (for example, a secret key such as might be generated via method 140) to cryptographically sign a message that includes an API call directed to a server system. The signed API call is then sent to the server system. Various methods may be employed for signing and transmitting the API call. For example, a protocol buffer may be defined for message exchange using the secret key. In various embodiments, the client system may sign the payload of the message or the HTTP headers (or both), etc. Flow proceeds to step 222. Various types of signatures may be employed in appropriate circumstances. For example, HMAC-SHA-256 may be used in some cases.

At step 222, the server system receives the signed message. Because the server system is also in possession of the secret key, the server system is able to check the authenticity of the signed message. At decision block 224, if the client system is not authorized, the process proceeds to step 226 and access is denied. If the client system is authorized, the process proceeds to step 228 and access is granted.

It should be noted that discussions of HTTP communications, which may be used to communicate API calls and other data as described herein, are intended to encompass secure HTTPS communications (which involve layering HTTP on some other protocol such as SSL or TLS), for example. HTTPS may provide bidirectional data encryption. Further, HTTP is used herein for exemplary purposes, but is not intended to limit the scope of the disclosure. In other embodiments, any of various communications protocols may be implemented in addition to and/or in place of HTTP.

Various advantages may be realized according to this disclosure. For example, authentication according to this disclosure may be more resistant to MITM attacks, and may further allow for detection of some MITM attacks. In one embodiment, the secret key may be established on a per-device basis. It may become possible to detect MITM attacks, because the server may be configured to allow only one active session per secret key at any given point of time. Thus if unauthorized access is attempted concurrently with authorized access via the same physical machine, the authorized user may be unable to access the API, which would indicate the possibility of the unauthorized key. In some instances, a notification may be generated based upon multiple concurrent access attempts with a single secret key. For example, the server system may trigger an automatic renegotiation of the secret key in response to the multiple concurrent access attempts.

In some instances, a client system may be lost or stolen. In those circumstances, the server system may deactivate the secret key and the public key associated with that client system in order to prevent any unauthorized access.

Further, in some embodiments, this disclosure may be resistant to eavesdropping attacks. The key derivation material (e.g., the nonce and the salt described in method 140) need not be exposed in unencrypted form on the wire. Further, the secret key that is derived from the key derivation material also need not be exposed on the wire at all. In some instances, the secret key may only ever exist in volatile memory on the server system and the client system, and never be recorded in non-volatile storage, which may provide additional security benefits.

Example Computing System

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Turning now to FIG. 7, a block diagram of a computing device (which may also be referred to as a computing system) 310 is depicted, according to some embodiments. Computing device 310 may be used to implement various portions of this disclosure. Computing device 310 is one example of a device that may be used as a mobile device, a server computing system, a client computing system, or any other computing system implementing portions of this disclosure.

Computing device 310 may be any suitable type of device, including, but not limited to, a personal computer system, desktop computer, laptop or notebook computer, mobile phone, mainframe computer system, web server, workstation, or network computer. As shown, computing device 310 includes processing unit 350, storage subsystem 312, input/output (I/O) interface 330 coupled via interconnect 360 (e.g., a system bus). I/O interface 330 may be coupled to one or more I/O devices 340. Computing device 310 further includes network interface 332, which may be coupled to network 320 for communications with, for example, other computing devices.

As described above, processing unit 350 includes one or more processors. In some embodiments, processing unit 350 includes one or more coprocessor units. In some embodiments, multiple instances of processing unit 350 may be coupled to interconnect 360. Processing unit 350 (or each processor within processing unit 350) may contain a cache or other form of on-board memory. In some embodiments, processing unit 350 may be implemented as a general-purpose processing unit, and in other embodiments it may be implemented as a special purpose processing unit (e.g., an ASIC). In general, computing device 310 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 312 is usable by processing unit 350 (e.g., to store instructions executable by and data used by processing unit 350). Storage subsystem 312 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 312 may consist solely of volatile memory in some embodiments. Storage subsystem 312 may store program instructions executable by computing device 310 using processing unit 350, including program instructions executable to cause computing device 310 to implement the various techniques disclosed herein.

I/O interface 330 may represent one or more interfaces and may be any of various types of interfaces configured to couple to and communicate with other devices, according to various embodiments. In some embodiments, I/O interface 330 is a bridge chip from a front-side to one or more back-side buses. I/O interface 330 may be coupled to one or more I/O devices 340 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processor configured to encrypt an item of data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software construct such as an application programming interface (API).

The term "configured to" is not intended to mean "configurable to." An unprogrammed FPGA, for example, would not be considered to be "configured to" perform some specific function, although it may be "configurable to" perform that function, and may be "configured to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   a server computing system storing a database;
   negotiating a shared key by:
   the server computing system receiving an encrypted and signed first item of random data from a client computing system, wherein the first item of random data is encrypted via a public encryption key of the server computing system and signed via a private signing key of the client computing system;
   the server computing system encrypting a second item of random data via a public encryption key of the client computing system;
   the server computing system signing the second item of random data via a private signing key of the server computing system;
   the server computing system generating a first copy of the shared key by combining the first and second items of random data; and
   the server computing system transmitting the encrypted and signed second item of random data to the client computing system, wherein the first and second items of random data are combinable by the client computing system to generate a second copy of the shared key;
   the server computing system receiving from the client computing system a first request to access the database, wherein the first request is sent via one or more API calls signed using the shared key;
   the server computing system receiving a second request to access the database, wherein the second request is sent via one or more API calls signed using the shared key, and wherein the second request is concurrent with the first request; and
   the server computing system triggering a renegotiation of the shared key in response to the server computing system receiving the second request.

2. The method of claim 1, wherein the database is a multi-tenant database.

3. The method of claim 2, wherein the client computing system is associated with a first tenant of the multi-tenant database, and wherein the server computing system allows the client computing system access to a portion of the multi-tenant database that is associated with the first tenant.

4. The method of claim 1, wherein the server computing system includes a plurality of individual servers.

5. The method of claim 1, wherein, separate shared keys are usable by separate client computing systems.

6. The method of claim 1, wherein separate shared keys are usable by separate individual users.

7. The method of claim 1, wherein the public encryption key of the client computing system and a corresponding private encryption key of the client computing system are based on a Trusted Platform Module (TPM) or a Hardware Security Module (HSM) of the client computing system.

8. An article of manufacture including a non-transitory, computer-readable medium having instructions stored thereon that are capable of causing a computing system to perform operations comprising:
   negotiating a shared key by:
   receiving an encrypted and signed first item of random data from a client computing system, wherein the first item of random data is encrypted via a public encryption key of the computing system and signed via a private encryption key of the client computing system;
   encrypting a second item of random data via a public encryption key of the client computing system;
   signing the second item of random data via a private encryption key of the computing system;
   generating a first copy of the shared key by combining the first and second items of random data; and
   transmitting the encrypted and signed second item of random data to the client computing system, wherein the first and second items of random data are combinable by the client computing system to generate a second copy of the shared key;
   receiving from the client computing system a first request to access information stored at the computing system via one or more API calls signed using the shared key;
   receiving a second request to access information stored at the computing system via one or more API calls signed using the shared key; and
   triggering a renegotiation of the shared key in response to the computing system receiving the second request.

9. The article of claim 8, wherein the operations further comprise:
   storing a timestamp and a hash associated with the first item of random data; and
   verifying, based on the timestamp and the hash, that a subsequent shared key is not based on the first item of random data.

10. The article of claim 8, wherein the first copy and the second copy of the shared key are generated via a Key Derivation Function.

11. The article of claim 8, wherein the one or more API calls signed using the shared key include signed timestamps.

12. The article of claim 8, wherein at least one of the first and second items of random data are generated pseudo-randomly.

13. The article of claim 8, wherein the computing system is further configured not to transmit the shared key to the client computing system.

14. The article of claim 8, wherein the computing system is further configured not to receive the shared key from the client computing system.

15. The article of claim 8, wherein the computing system is further configured not to store the shared key in non-volatile storage.

16. The article of claim 8, wherein the shared key is established on a per-device basis.

17. The article of claim 8, wherein the operations further comprise allowing at most one concurrent access to the information stored at the computing system based on the shared key.

18. The article of claim 17, wherein the operations further comprise generating a notification in response to more than one concurrent attempt to access the information stored at the computing system based on the shared key.

19. A method comprising:
   negotiating, with a computing system, a shared key by:
   (i) encrypting, via a server public encryption key, a first item of random data;
   (ii) signing, via a client private signing key, the first item of random data;

(iii) transmitting the encrypted and signed first item of random data to a server computing system;

(iv) receiving, from the server computing system, an encrypted and signed second item of random data, wherein the second item of random data is encrypted via a client public encryption key and signed via a server private signing key, and wherein the first and second items of random data are combinable by the server computing system to generate a first copy of a shared key; and (v) generating a second copy of the shared key by combining the first and second items of random data;

(vi) requesting, with the computing system, access to a database of the server computing system via a first API call signed using the shared key; and (vii) in response to receiving, at the computing system, a shared key renegotiation command from the server computing system that was generated in response to the server computing system detecting a second API call signed using the shared key wherein the second API call is concurrent with the first API call, performing (i)-(v) to renegotiate a second shared key.

20. The method of claim 19 further comprising:

verifying, with the computing system, an identity of the server computing system via the encrypted and signed second item of information and the server public encryption key.

* * * * *